W. S. HUDSON.

LOCOMOTIVE.

No. 6,950. Reissued Feb. 29, 1876.

Witnesses:

Henry Gardner

C. C. Stetson

Inventor:

William S. Hudson by his attorney

F. S. Stetson

N. PETERS, PHOTO-LITHOGRAPHER, WASHINGTON, D. C.

UNITED STATES PATENT OFFICE.

WILLIAM S. HUDSON, OF PATERSON, NEW JERSEY.

IMPROVEMENT IN LOCOMOTIVES.

Specification forming part of Letters Patent No. 64,533, dated May 7, 1867; reissue No. 6,950, dated February 29, 1876; application filed December 7, 1875.

*To all whom it may concern:*

Be it known that I, WILLIAM S. HUDSON, of Paterson, in the county of Passaic and State of New Jersey, superintendent of the Rogers' Locomotive Works, have invented certain new and useful Improvements in Locomotives; and I do hereby declare that the following is a full and exact description thereof.

The patent to Mr. Levi Bissell, dated 1857, sets forth a mode of constructing and arranging a swiveling-truck so that when the locomotive is on a curved portion of the road the truck shall be necessarily held in a correct or very nearly correct position corresponding to the curvature. But Mr. Bissell's locomotive could not, without further invention, be provided with a truck so operating at each end.

The object of my invention is to provide a truck so swiveling and guided at each end of the locomotive, while the structure is supported as firmly, and with the same liberty to adapt itself to uneven or twisting portions of the track, as the ordinary or best American locomotives. My locomotive will run very nearly or quite as well either end foremost.

I will proceed to describe what I consider the best means of carrying out my invention.

The accompanying drawings form a part of this specification.

Figure 1:
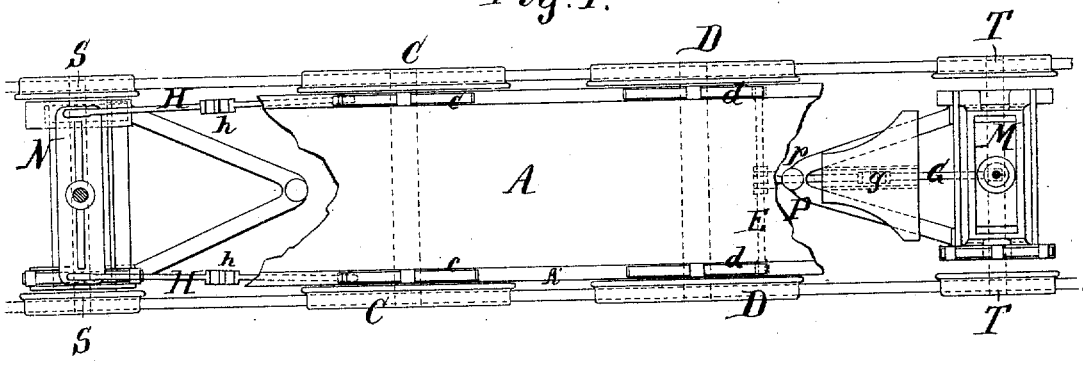
Figure 2:
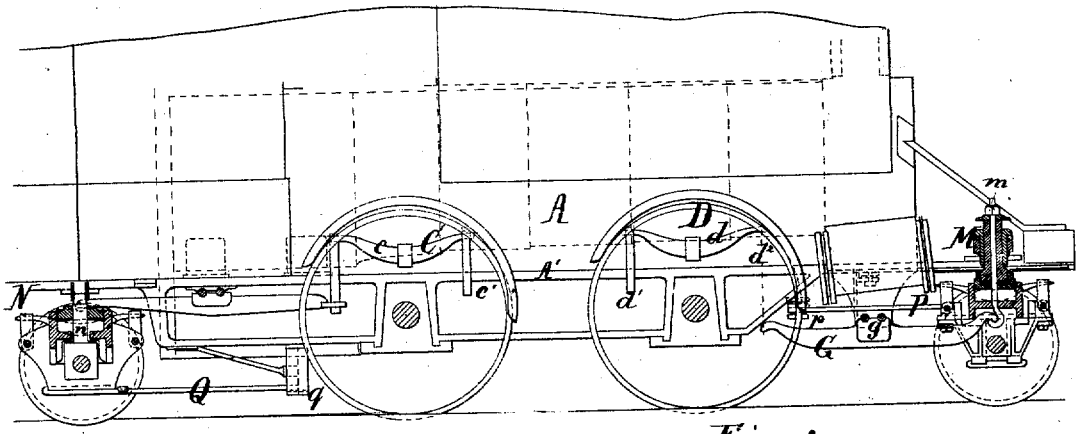
Figure 4:
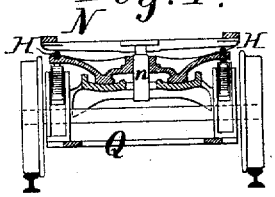
Figure 3:
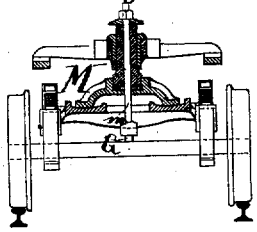

Figure 1 is a plan view of a locomotive constructed according to my invention, with a portion of the upper works broken away to show the peculiarities of the running parts. Fig. 2 is a side elevation of the running parts, some portions being sectioned and others represented as transparent, the better to show the novel features. Fig. 3 is a cross-section on the line S S in Fig. 1. Fig. 4 is a corresponding section on line T T in same.

The figures represent the novel parts, with so much of the ordinary parts as is necessary to show their relations thereto.

Similar letters of reference indicate like parts in all the figures.

The materials may be iron and steel, as usual.

A is a boiler, A′ the frame, and C and D the driving-wheels. These latter are coupled together by parallel rods, and are driven by connecting-rods, not represented, in the long-approved manner. Over the bearings of the wheels D are springs *d*, tied down at one end by links $d^1$, which are attached to the frame A′, and at the other end by links $d^2$, which are attached to the opposite ends of a cross-lever, E, which is represented distinctly in dotted lines in Fig. 1. G is an equalizing lever, which extends from the center of the cross-lever E to the center hook or king-bolt of the truck M. It receives the weight of this portion of the superincumbent mass on the center *g*. Over the bearings of the wheels C are springs *c*, connected to the frame A′, as usual, by links *c′* at one end, and to the ends of two equalizing-levers, H H, at the other end, each spring *c* being independently attached to a lever, H, and ready to act without reference to the action of its mate. The two equalizing-levers H H rest their opposite ends on the sides of the truck N, and support the weight of that end of the boiler, &c., on the two centers *h h*, at the sides of the locomotive, as will be clearly understood by an inspection of Fig. 1. The weight of the mass supported on the equalizing-levers, therefore, rests on three points so arranged as to form a triangle, one point being the center *g* of the single lever G, the remaining points being the two centers *h h* of the separate levers H H. The smaller portions of the load, supported directly by the straps *c′* $d^1$, are not included, of course.

The arrangement by which the trucks M and N are swiveled and confined will be readily understood by those familiar with the construction described in Mr. Bissell's patent, above referred to and generally known as the Bissell truck. Each truck has but one pair of wheels. Over the center of each is a king-bolt. Each side of said bolt is a double incline, on which the weight is so supported that gravity compels a tendency to return to the proper position for straight track.

A long triangular frame, P, extends inward toward the center of the structure from the truck M, and centers on a pivot, *p*, fixed to the boiler A. A corresponding frame, Q, extends from the truck N and centers on the pivot *q*. The effect of this feature of the mechanism is, as in Mr. Bissell's arrangement, to hold the trucks straight on straight lines, and to hold them properly diagonal on curves;

but my arrangement differs from Mr. Bissell's in having a truck at each end instead of at one end only. And this arrangement is made possible and practicable and highly conducive to the easy and successful working of the locomotive in either direction, by the peculiar arrangement of the equalizing-levers G H H and the cross-lever E, above described. I propose to introduce elliptic or other springs in the trucks, when desired, and to manufacture all the several details in any of the approved styles. It will be observed that while the main body or foundation portions of each truck M and N move to one side and the other, as the road curves in one direction or the other, the king-bolts *m* and *n*, and the parts to which equalizing-levers connect, do not so move laterally, but remain always in the same relation to the axis of the locomotive-boiler.

Some of the advantages due to certain features of my invention may be separately enumerated as follows: First, by reason of the fact that while a large portion of the weight of the entire structure is carried on the driving-wheel C D, a certain proportion being also supported on a laterally-moving truck, hung at each end, suitably connected to the driving-wheels and to the locomotive-frame, my locomotive is adapted to conform to all the curves met with in practice, and to run either end foremost with the same smoothness and safety. Second, by reason of the fact that I employ a connecting guide-truck, or what is known as the Bissell truck, at each end of the locomotive, instead of, as heretofore, at the front end only, my locomotive is not only adapted to run successfully either end foremost, but it performs its work in both directions with the peculiar facility and safety due to the Bissell truck. Third, by reason of the fact that my equalizing-levers H H equalize the load between the rear drivers C and the sliding top of the rear truck N, I am able to obtain an equalization of the load and division of the shocks and connections between these two, in the same manner as is ordinarily obtained between two pairs of rigidly-mounted drivers; and also to allow the under and main portion of the truck N to move to one side and the other, as is required on curves, the equalizing not interfering with the lateral movement, and the lateral movement not interfering with the equalizing action. Fourth, by reason of the fact that my single longitudinal lever G *g* and cross equalizing-lever E are combined and arranged as represented, I am able to equalize in the same manner between the forward drivers D and the top portion of the forward truck M, so as to divide the shocks, &c., and to support the weight of the locomotive at the single point *g*, on or near the central line of the locomotive, and thus, in connection with the supporting-points *h h* on which the rear equalizing-levers H turn to support the entire mass of the locomotive on three points, which is found in practice to be the best for allowing the locomotive to adapt itself to inequalities in the track, and to do this without preventing the main body of the truck M from being moved to one side and the other, and without interfering in any way with the perfection of the equalizing action.

Having now fully described my invention, what I claim as my improvements in locomotives, and desire to secure by Letters Patent, is as follows—

1. A locomotive having driving-wheels under the central part, and a laterally-moving truck under each end, combined for joint operation, as herein specified.

2. In combination with the body of a locomotive and with a laterally-moving truck under each end thereof, the within-described equalizing-levers H *h* adapted to equalize between the rear drivers C and the top portion of the rear truck, and to allow the lateral movement of the running-gear of the rear truck, without disturbing the action of the equalizing-levers, substantially as herein set forth.

3. The equalizing-lever G *g* and cross-lever E mounted at the front of the locomotive, and combined with the forward truck and forward drivers, substantially as represented, so as in connection with the laterally-moving truck at the rear, and the system of equalizing-levers at the rear, to support the weight on the three points *g h h* by independently-equalizing systems of levers and wheels, substantially as and for the purposes herein set forth.

WM. S. HUDSON.

Witnesses:
H. CLAY SMITH,
M. F. HALLECK.